United States Patent [19]

Breaux et al.

[11] 3,970,961
[45] July 20, 1976

[54] THERMIONIC CATHODE TRANSVERSE-DISCHARGE GAS LASER TUBE

[75] Inventors: Onezime P. Breaux; Gustav K. Medicus, both of Dayton, Ohio

[73] Assignee: The United States of America as represented by the Secretary of the Air Force, Washington, D.C.

[22] Filed: May 9, 1975

[21] Appl. No.: 576,058

[52] U.S. Cl. .................. 331/94.5 PE; 331/94.5 G; 313/211; 313/217; 313/244; 313/259
[51] Int. Cl.² ..................... H01S 3/22; H01S 3/097
[58] Field of Search ............... 331/94.5 G, 94.5 PE, 331/94.5 D; 330/4.3; 313/179, 180, 209, 210, 211, 217, 243, 244, 245, 246, 258, 259

[56] References Cited
UNITED STATES PATENTS

| | | | |
|---|---|---|---|
| 3,403,353 | 9/1968 | Lamb, Jr. et al. | 331/94.5 PE |
| 3,787,781 | 1/1974 | Medicus et al. | 331/94.5 D |
| 3,801,202 | 4/1974 | Breaux | 331/94.5 PE |

FOREIGN PATENTS OR APPLICATIONS

| | | | |
|---|---|---|---|
| 43-8307 | 3/1968 | Japan | 331/94.5 G |

*Primary Examiner*—Robert J. Webster
*Attorney, Agent, or Firm*—Joseph E. Rusz; Robert Kern Duncan

[57] ABSTRACT

An improved transverse-discharge gas laser tube is provided by positioning thermionic cathodes diametrically opposite each other across the plasma location with anodes positioned at 90° to the cathodes all contained within an electron repelling envelope. Laser configurations for both large and small circular cross-section plasmas are disclosed. A thermionic cathode plasma slab laser with a magnetic field that may be modulated to provide modulation of the laser beam is also disclosed.

5 Claims, 11 Drawing Figures

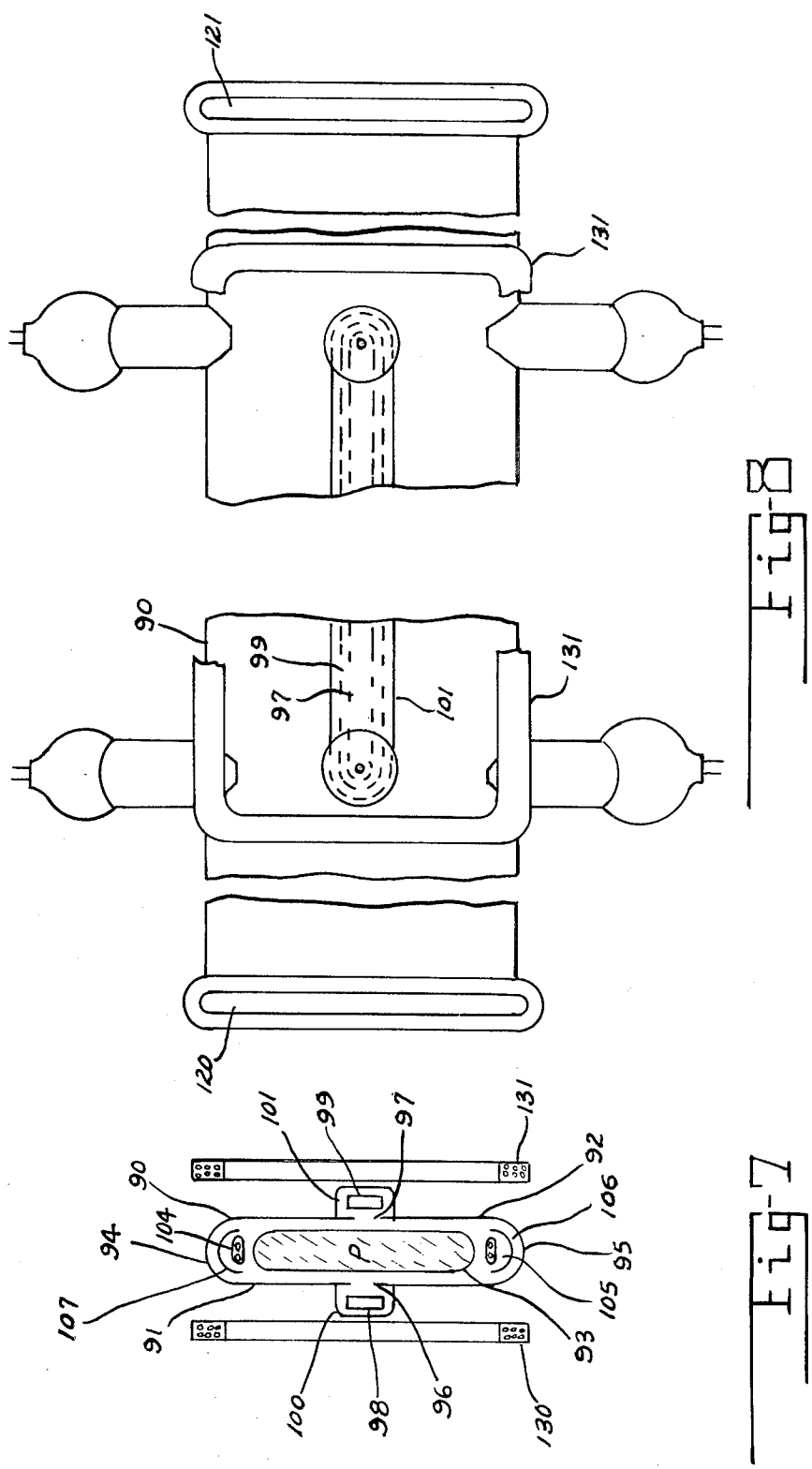

THERMIONIC CATHODE TRANSVERSE-DISCHARGE GAS LASER TUBE

RIGHTS OF THE GOVERNMENT

The invention described herein may be manufactured and used by or for the Government of the United States for all governmental purposes without the payment of any royalty.

BACKGROUND OF THE INVENTION

The field of the invention is in the gas laser art.

Transverse-discharge gas lasers with cold cathodes are well known. Generally, they have the limitation that the cathode fall cannot be reduced below approximately 80 to 100 volts; even when cathode materials with the highest yield of electrons liberated by impacting ions are used. This limitation causes the following disadvantages. The energy losses in these tubes are much higher than those dictated by optimum energy distribution of the electrons injected into the plasma (for maintaining the plasma and for excitation); the cathode sputtering is much more severe than it would be under optimum conditions; and the energy distribution of the electrons injected into the plasma cannot be optimized with respect to laser action. Typical examples of prior art cold-cathode devices are exemplified by U.S. Pat. Nos. 3,396,301 to patentees Kubayashi et al., and 3,787,781 to patentees Medicus et al.

Thermionic cathode transverse discharge lasers are known as disclosed by U.S. Pat. No. 3,719,899 to patentee Breaux. Thermionic hollow cathodes for lamps are disclosed in U.S. Pat. No. 3,558,964 to patentee White. The typical electrode configurations in the prior art slotted-hollow-cathode, FIG. 8, and plasma slab lasers require comparatively large cathode surface areas and, consequently, require large and bulky heaters when thermionic cathodes are used. To obtain uniform cathode temperatures and uniform emission currents is difficult due to the prevalency of concentrations of the discharge to localized areas, inhomogeneous cathode emission, and cathode spot formations.

SUMMARY OF THE INVENTION

A unique laser structure is disclosed in which the lasing plasma is enclosed by a repeller electrode, electrically at cathode or lower potential. The repeller electrode is also the gas tight container of the laser gas. Small, compact, efficient, axis-parallel thermionic cathodes, and anodes are also located within the electron repelling container but are outside the general plasma area. The electrons emitted from the cathodes fall through cathode potential to plasma potential, ionize and excite the plasma that is positioned and contained by the repeller elecrode, and eventually exit the plasma to the anodes. This provides a relatively low-voltage transverse electrical discharge having efficient, optimized excitation of the gas with relatively low sputtering.

BRIEF DESCRIPTION OF THE DRAWING

FIG. 7 is a schematic representation of a cross section of the embodiment represented in FIG. 6, showing, in addition, electromagnetic field generating coils;

FIG. 8 is a schematic diagram showing a longitudinal view of a field coil positioned on a laser tube;

FIG. 9 is an electrical schematic diagram showing the circuitry of a typical circular cross section plasma embodiment.

DESCRIPTION OF THE PREFERRED EMBODIMENT

Figure 1:
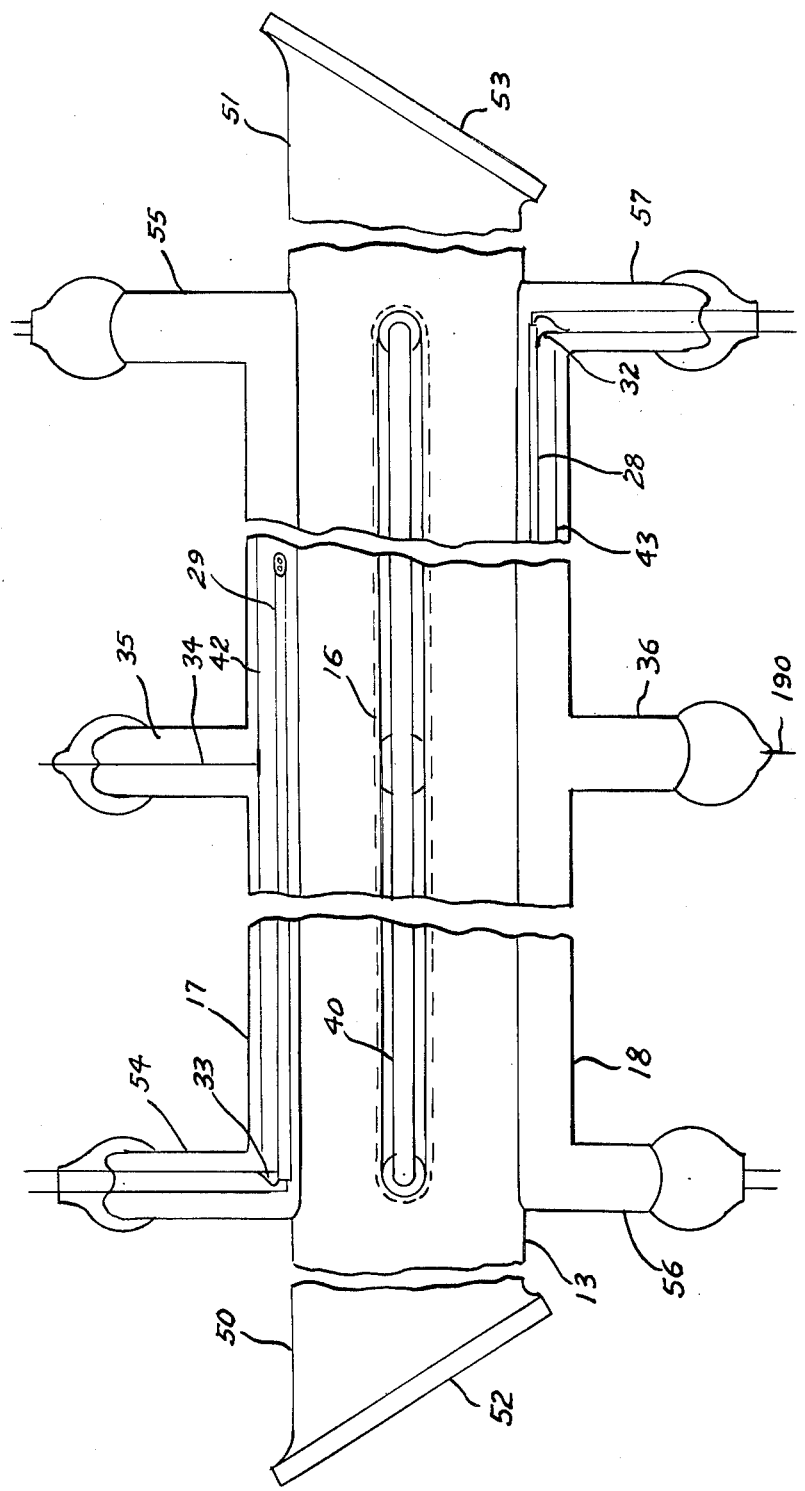
FIG. 1 is a representative longitudinal, schematic diagram of an embodiment of the invention.
Figure 2:
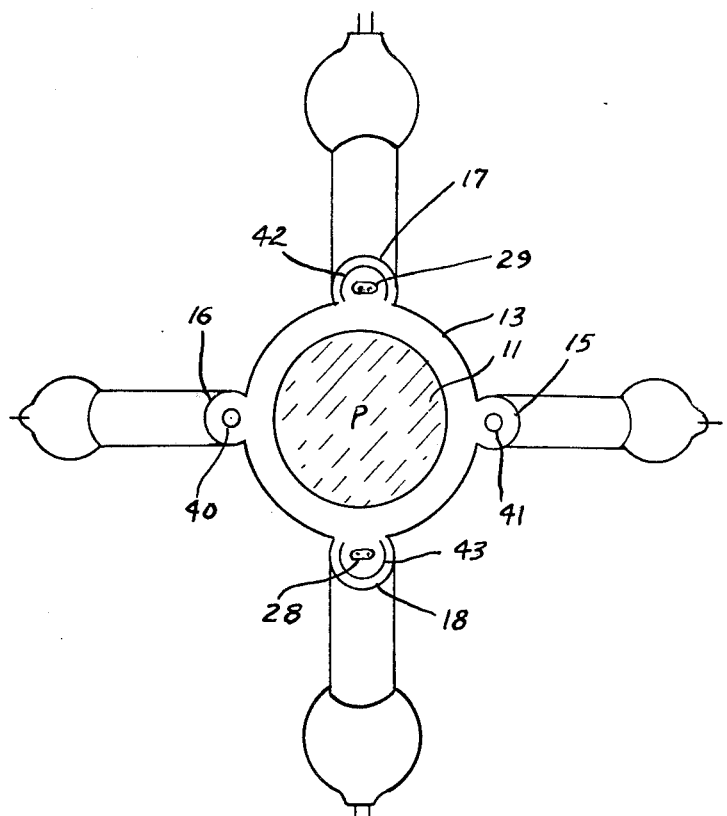
FIG. 2 is a representative schematic diagram of a cross section of the embodiment represented longitudinally in FIG. 1.
Figure 3:
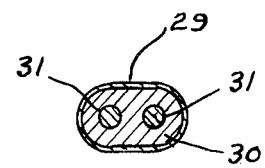
FIG. 3 is a schematic diagram showing a typical cross section of a heater-cathode arrangement.
Figure 4:
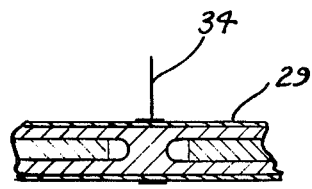
FIG. 4 is a schematic diagram showing the positioning of two heater elements in a common cathode.
Figure 5:
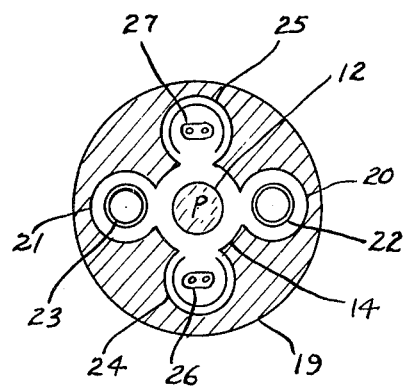
FIG. 5 is a schematic representation of a cross section of a small cross section circular beam embodiment.
Figure 6:
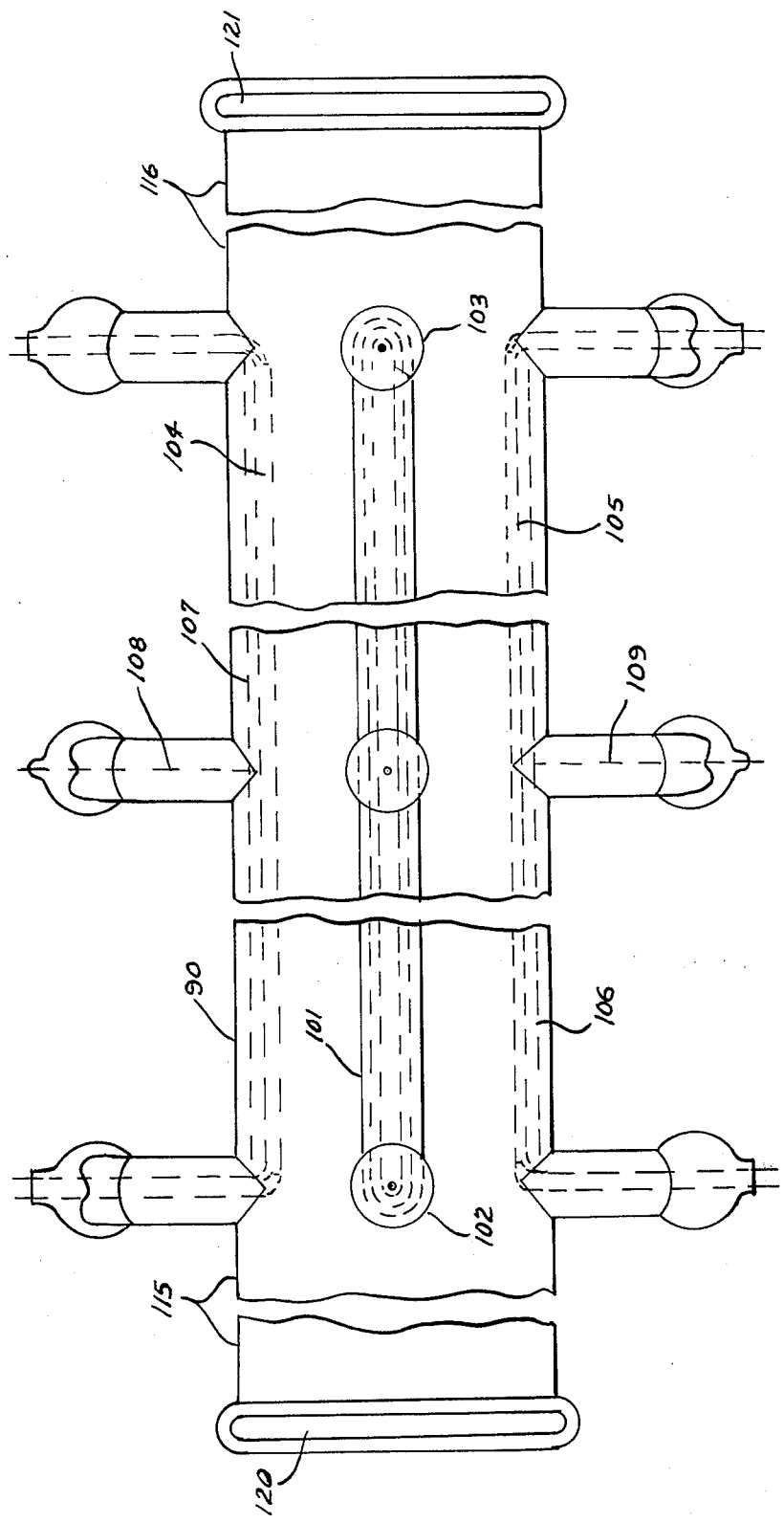
FIG. 6 is a schematic longitudinal representation of a plasma slab embodiment.
Figure 10:
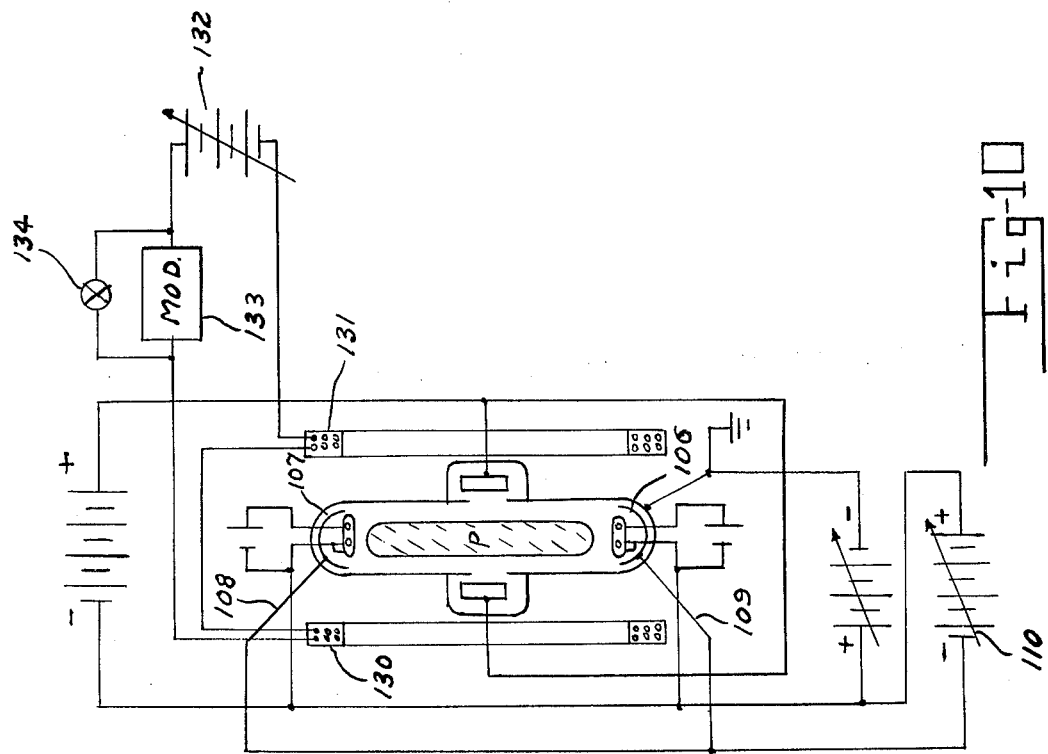
FIG. 10 is a typical electrical schematic diagram for a plasma slab embodiment.

FIGS. 1, 2, 3, 4 and 5 illustrate schematically embodiments of the invention in which the plasma is substantially circular in cross section. The laser depicted by the cross section representation in FIG. 2 has a relatively large cross section plasma 11, while the laser cross section represented in FIG. 5 provides a relatively small cross section plasma 12. It is to be observed that in operation the two embodiments represented are substantially the same, with the only difference being that the repeller envelopes 13 and 14 are different in diameter and hence the plasmas 11 and 12 contained therein are correspondingly larger and smaller in cross sections. The repeller envelope 13 as shown in FIGS. 1 and 2 is fabricated from relatively thin sheet metal. The effective repeller is the entire equal-potential gas-enclosing inside surfaces, that is, the inside surfaces of the cylinder 13, the anode enclosures 15 and 16, and the cathode enclosures 17 and 18. In fabricating embodiments of the invention represented by FIG. 5 the laser structure is conventionally formed from a solid rod of material. The electron repelling action takes place from the equal-potential interior surface 14 surrounding the plasma 12 and the interior surfaces 20 and 21 surrounding the anodes 22 and 23, and the interior surfaces 24 and 25 surrounding the thermionic cathodes 26 and 27. Conventional conductive material, such as Kovar or Monel, may be used to fabricate the envelope structure, and the invention is suitable for use with conventional laser gasses, such as Helium-Cadmium and Helium-Neon mixtures.

The cathodes 26, 27 (FIG. 5), and 28, 29 (FIGS. 1 and 2), which are conventional oxide cathodes, are small flattened cylindrical tubes parallel to the laser tube axis and are enclosed within the repeller envelopes 19 (FIG. 5) and 13 (FIG. 2). Conventional cathode supports are used to prevent sagging and distortion in long tubes. FIG. 3 shows in detail a cross section of a typical heater-cathode structure. The cathode 29, in the shape of a flattened tube, surrounds the conventional insulator 30 which has two parallel holes for containing the heater wire 31. (Only that side of the flat cathode which faces the plasma need be emitting.) The cathode heaters consist of two symmetrical hairpins, i.e., two per cathode. (The embodiments illustrated contain two cathodes, hence they have four heater elements.) By using two heaters per cathode the thermal expansion is reduced and the voltage of each heater hairpin is half that of a full-length heater. The turning points of the hairpins are located at the center of the active lengths of the cathodes inside the ceramic insulation as shown in FIG. 4. One end of each hairpin is connected to the cathode, as illustrated at 32 and 33 (FIG. 1) for two of the heater elements. All four heaters, in this embodiment, are so connected.

The anodes 40 and 41 are fabricated from conventional anode rod material, such as Kovar, and are positioned axis-parallel with the tube. They are also physically (and electrically) enclosed by the repeller electrode. The repeller electrode consists of the generally circular cylinder 13 with four diametrically opposite flutes 15, 16, 17 and 18 in which the diametrically opposite cathodes 28 and 29, and anodes 40 and 41 are located. The generated plasma 11 is substantially cylindrical in shape and positioned in spaced apart relationship to the cylindrical repeller electrode 13. Generally, it is desirable to position a heat shield, as shown at 42 and 43, between the cathodes and the repeller wall. The electrical potential of the heat shields is a few volts more negative against the plasma than the cathodes. The heat shields are typically constructed from the same material from which the repeller is fabricated. The foregoing structural description referring to FIGS. 1 and 2 also generally applies to the structures represented by FIG. 5. However, in embodiments as represented by FIG. 5, it has been found generally desirable to conventionally liquid-cool the anodes 22 and 23, hence in these embodiments the anode members are tubes rather than rods.

Figure 11:
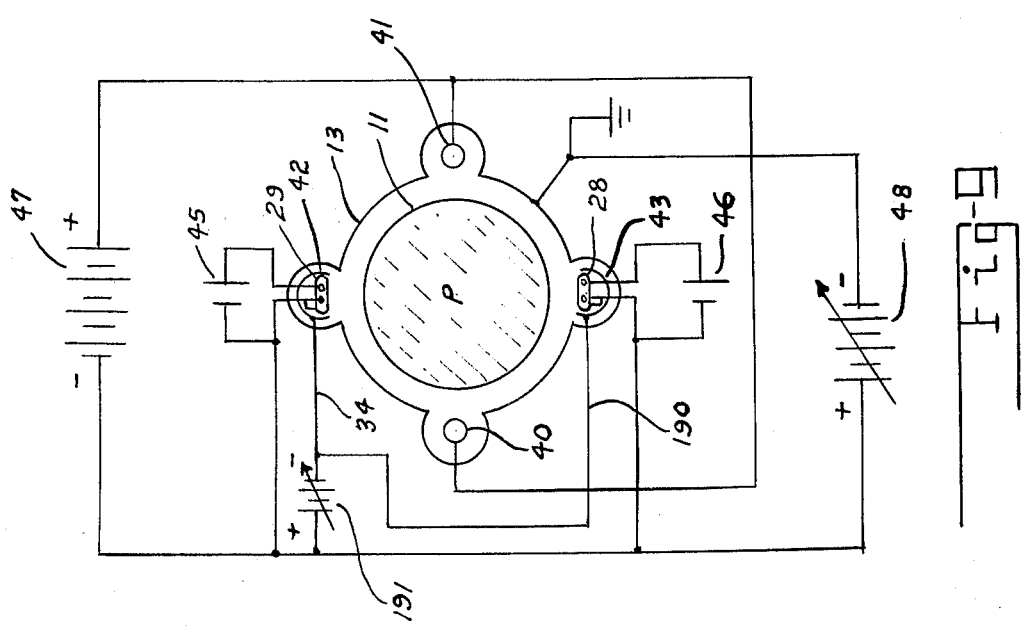
FIG. 11 is a plot showing typical potential distribution in a typical embodiment of the invention.
Figure 11:
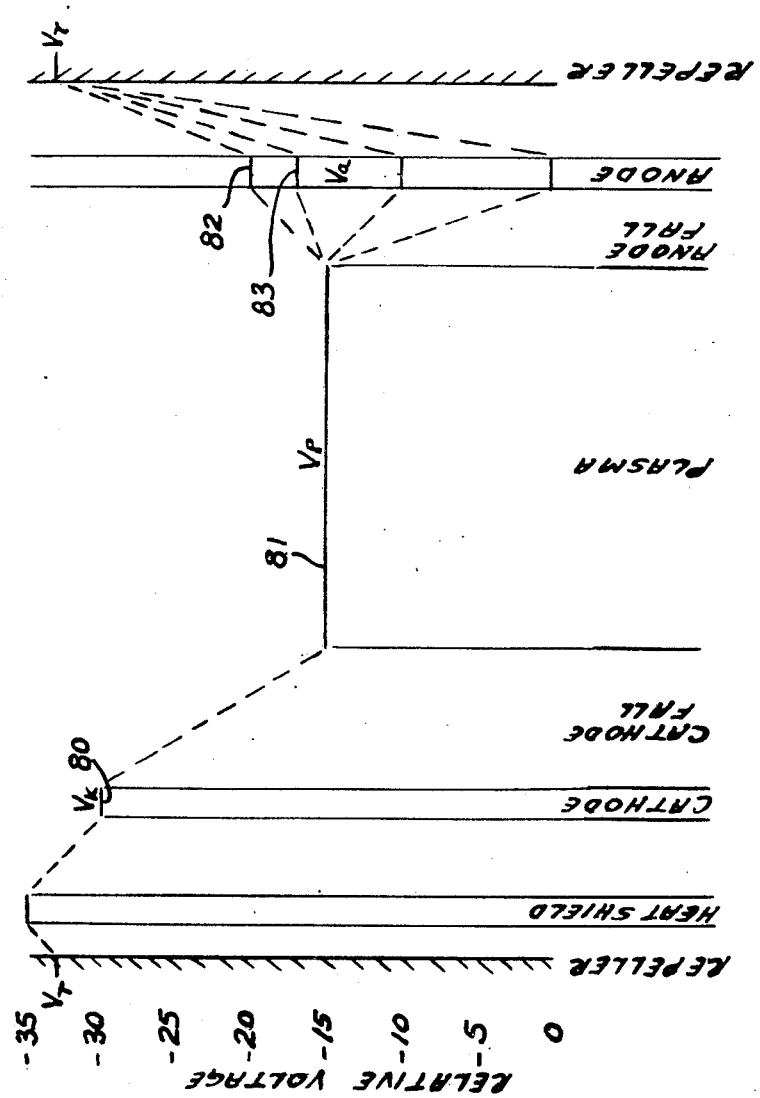

FIG. 9 is a typical electrical schematic diagram for embodiments of the invention represented by FIGS. 1 through 5. Conventional current source 45 is used to energize the two heaters contained in cathode 29, and conventional current source 46 is used to energize the two heaters contained in cathode 28 (also cathodes 26 and 27, FIG. 5). Conventional power source 47 electrically positions the anodes approximately 20 to 40 volts positive with respect to the cathodes. Variable potential source 48 electrically positions the repeller at a potential from approximately 3 to 5 volts below (negative) the cathode, and variable potential source 191 positioned the heat shield approximately 2 volts more negative than the repeller. A plot showing typical potential distribution is shown in FIG. 11. Typical values of gas pressure are from 0.1 to 0.5 torr. Typical parameters of an operating embodiment are; gas pressure approximately 0.1 torr, discharge voltage (anode-cathode) approximately 31 volts, heater power approximately 6 amperes at 7 volts, and discharge currents from 0.4 to 0.9 amperes.

Referring back to FIG. 1, the active length of the laser tube is the length of the electrical elements comprising the cathodes and anodes or approximately the length of the flutes. The circular-cylindrical part of the repeller tube (without the flutes) extends beyond the active length as shown at 50 and 51, and has conventional laser windows 52 and 53 attached at each end. Tubulations 54, 55, 56 and 57 are attached to the flutes 17 and 18 and to the cylindrical repeller tube 13, substantially perpendicular to the tube axis. The tubulations envelope the feedthroughs for the cathode heaters and the cathode leads. Similar tubulations connect with the anode flutes 15 and 16 for containing the feedthroughs and anode supports analogous to those of the cathodes. The spacing between the anodes 40 and 41 and the inside walls of the flutes 15 and 16 must be sufficiently small (approximate spacings of one to three mm are suitable) to prevent plasma formation and a discharge between anodes and flutes. Additionally, or alternatively, the insides of the flutes can be covered with a layer of insulating material.

To further describe the operation of the invention, the electrons emitted from the cathodes "fall down" from cathode potential 80 (FIG. 11) to plasma potential 81, i.e., they gain the energy $e(V_k-V_p)$ in the "cathode fall" $(V_k-V_p)$, and ionize and excite the plasma region. The repeller potential $V_r$, 82, is slightly negative (3 volts-typically) with respect to $V_k$; thus, the electron current to the repeller is negligible, as also is any current to the heat shields which are typically placed a couple of volts below the repeller potential. The anode potential $V_a$ is in the vicinity of the plasma potential $V_p$; $V_a$ may be slightly negative (electron repelling) or slightly positive (electron attracting) with respect to $V_p$. The actual potential relationship assumed by the plasma with respect to the anode is substantially dependent upon the relative anode size, the gas pressure in the tube, and the discharge current flowing. It is interesting to observe that satisfactory operation is obtained in which an anode rise (i.e., more negative, as at 82 and 83) occurs, and in these conditions the actual potential of the plasma is above (more positive) than that of the anode. The anode current, and thereby, substantially the cathode emission current, is controlled by the potential distribution between the plasma and the anode(s), which determines the diffusion of the slow plasma electrons (as opposed to the fast cathode fall electrons) to the anodes. Very few of the fast cathode fall electrons escape to the anodes. The majority of those cathode-fall electrons which do not lose energy by inelastic collisions on their initial passes through the plasma oscillate inside the potential trough between the repeller walls and/or between the cathodes. Those fast electrons are not deflected from their essentially straight paths through the plasma by the "leaks" of the potential trough in the vicinity of the anodes.

Generally, the mean free path of the cathode-fall electrons is large compared to the diameter of the plasma cylinder (or, to the width of the plasma slab in the next to be described embodiment), such that the cathode-fall electrons may oscillate in the potential trough several times before they lose energy by inelastic collisions (hollow-cathode action). At higher gas pressures, the cathode-fall electrons lose their energy on the first pass, otherwise the general behavior of the plasma and the potential distributions will substantially remain the same.

FIGS. 6, 7, 8 and 10 are illustrative of "plasma slab" embodiments of the invention. In these embodiments the repeller 90 has a flat-tube shape. The flat-tube has two parallel side walls 91 and 92 with distance "d" between them and with a width "w" and length "l", where w times l is the active surface area of the repeller, i.e., that area of one wall adjacent to the plasma. Two substantially half-cylinders 94 and 95 connect the parallel sidewalls 91 and 92. The plasma slab laser tube is constructed such that "d" is much smaller than "w", and "w" is much smaller than "l". The flat sidewalls 91 and 92 have slots 96 and 97 along their middle lines parallel to the tube axis. The anodes 98 and 99 are positioned parallel to these slots, and outside the effective plasma area but still in the repeller field. The anodes are enclosed in channels 100 and 101 which are attached to the body of the repeller. In the embodiment illustrated the anodes 98 and 99 are rectangular bars. Other cross sections such as circular cylinders, half-cylinders, or the like are feasible alternatives. The anodes may also be fabricated hollow and extend through the tubulations and feedthroughs 102 and 103 (and for the opposite anode through the similar tubulation not shown because on the back side) so that a heating or cooling fluid may be passed through the anodes. The distance between the anodes 98, 99 and the channels 100, 101 (and the back side of the plane parallel repeller tube when it protrudes over the channels, (as is shown, and as is preferred), must be sufficiently small to prevent plasma formation and a discharge between anodes and channels. As previously mentioned in the other described embodiments, an insulating coating may also be applied to the insides of the channels. The cathodes 104 and 105, the heaters contained therein, and the heat shields 106 and 107 are analogous to the previously described embodiments with the exception that the repeller must be fabricated from electrically conductive and nonmagnetic material for those embodiments having a magnetic optimizing field. A variable voltage potential 110 (FIG. 10) is applied to the shields. The exact potential is not critical; generally a potential between the cathode potential and the potential of the repeller is satisfactory. The protrusions 115 and 116 of the repeller tube beyond the active length 1 on either end of the laser tube may have the same cross section as the repeller tube (as illustrated) or the end protrusions may have a rectangular cross section of thickness $d$ and width $w$ (as they were previously defined). The Brewster-angle windows 120 and 121 must be inclined against the plane through the cathode axes as illustrated.

It has been found that operation of the plasma slab laser may be improved by passing a perpendicular magnetic field through the plasma slab. The magnetic field is generated by coils 130 and 131 exterior to and adjacent the active area of the repeller, and applied parallel to the plane parallel repeller tube walls and perpendicular to the tube axis. The magnetic field strength is adjusted by varying the output power of the dc power supply 132. The strength of the magnetic field is not critical. Optimization of the operation of the laser is determined by conventionally observing the laser output while the strength of the magnetic field is varied. A range of magnetic field strength from approximately 10 to 1000 gauss is a suitable range of variation of field strengths to optimize the lasing.

It has been found that the laser beam may be modulated by superimposing a modulation signal from the modulator 133 on the dc field excitation current from the dc supply 132 (with switch 134 opened when modulating).

The anode-cathode voltage, the repeller potential, and general voltage distributions throughout the plasma-slab laser tube are substantially the same as for the earlier described embodiments, as shown by the representative voltage distribution plot of FIG. 11.

Obviously, in operating the laser tube embodiments as disclosed herein to provide a laser beam the tubes are conventionally positioned in an optical cavity and resonated with the lasing characteristics of the particular gas used in the tube.

We claim:
1. A thermionic cathoe transverse-discharge gas laser tube comprising:
   a. an electrically conductive substantially tubular envelope having a longitudinal axis, containing a gas for lasing, terminated at each end by a Brewster-angle window, and providing an electric potential surface on the said envelope;
   b. a first thermionic cathode positioned in axis-parallel relationship with the said envelope axis within the said electric potential surface.
   c. a second thermionic cathode in axis-parallel relationship with the said envelope axis, positioned diametrically opposite the said first thermionic cathode and within the said electric potential surface;
   d. a first anode positioned in axis-parallel relationship with the said envelope axis and positioned within the said electric potential surface;
   e. a second anode positioned in axis-parallel relationship with the said envelope axis and positioned within the said electric potential surface diametrically opposite the said first anode;
   f. means for providing a relative positive electric potential on the said first and second anodes with respect to an electric potential on the said first and second cathodes;
   g. means for heating the said first and second thermionic cathodes to provide an emission of electrons from the said cathodes; and
   h. means for providing a negative potential on the said electrically conductive envelope with respect to the said cathode potential whereby the said potential surface on the said envelope is electron repelling.

2. The laser tube as claimed in claim 1 wherein a heat shield is positioned between the said cathodes and the said electric potential surface on the said envelope, whose potential is a few volts negative against the cathodes.

3. The laser tube as claimed in claim 2 wherein the said tubular envelope is a flattened tube with a first and a second plane-parallel sides, and the said Brewster-angle windows are inclined against the plane through the said cathode axes.

4. The laser tube as claimed in claim 3 where a magnetic field is passed through the said flattened envelope substantially in a perpendicular relationship to the said plane-parallel side.

5. The laser tube as claimed in claim 4 wherein means is provided for modulating the said magnetic field.

* * * * *